US010547083B2

(12) United States Patent
Cheng et al.

(10) Patent No.: US 10,547,083 B2
(45) Date of Patent: Jan. 28, 2020

(54) ELECTROLYTE FORMULATIONS FOR LITHIUM ION BATTERIES

(71) Applicant: Wildcat Discovery Technologies, Inc., San Diego, CA (US)

(72) Inventors: Gang Cheng, San Diego, CA (US); Ye Zhu, San Diego, CA (US); Deidre Strand, San Diego, CA (US)

(73) Assignees: WILDCAT DISCOVERY TECHNOLOGIES, INC., San Diego, CA (US); JOHNSON CONTROLS TECHNOLOGY COMPANY, Holland, MI (US)

( * ) Notice: Subject to any disclaimer, the term of this patent is extended or adjusted under 35 U.S.C. 154(b) by 244 days.

(21) Appl. No.: 14/746,761

(22) Filed: Jun. 22, 2015

(65) Prior Publication Data

US 2016/0372791 A1 Dec. 22, 2016

(51) Int. Cl.

| | |
|---|---|
| ***H01M 10/0567*** | (2010.01) |
| ***H01M 10/0566*** | (2010.01) |
| ***H01M 10/0564*** | (2010.01) |
| ***H01M 10/056*** | (2010.01) |
| ***H01M 10/05*** | (2010.01) |
| ***H01M 4/485*** | (2010.01) |
| ***H01M 10/0525*** | (2010.01) |

(52) U.S. Cl.

CPC ....... *H01M 10/0567* (2013.01); *H01M 4/485* (2013.01); *H01M 10/0525* (2013.01); *H01M 2300/0025* (2013.01)

(58) Field of Classification Search

None

See application file for complete search history.

(56) References Cited

U.S. PATENT DOCUMENTS

| | | | | |
|---|---|---|---|---|
| 3,433,679 A | 3/1969 | Johnson et al. | | |
| 4,740,437 A | 4/1988 | Fujii et al. | | |
| 5,691,081 A | 11/1997 | Krause et al. | | |
| 6,022,643 A * | 2/2000 | Lee | H01M 4/5815 | 429/303 |
| 6,060,184 A | 5/2000 | Gan et al. | | |
| 6,136,477 A | 10/2000 | Gan et al. | | |
| 6,403,256 B1 | 6/2002 | Gan et al. | | |
| 7,172,834 B1 | 2/2007 | Jow et al. | | |
| 7,358,012 B2 | 4/2008 | Mikhaylik | | |

(Continued)

FOREIGN PATENT DOCUMENTS

| | | | |
|---|---|---|---|
| CN | 101567472 | * 10/2009 | H01M 10/40 |
| JP | 2012/174546 | * 9/2012 | H01M 10/052 |

(Continued)

OTHER PUBLICATIONS

English translation of CN101567472 (2009).*

(Continued)

*Primary Examiner* — Yoshitoshi Takeuchi

(74) *Attorney, Agent, or Firm* — Philip S. Hof; The Small Patent Law Group, LLC

(57) ABSTRACT

Electrolyte formulations including additives or combinations of additives. The electrolyte formulations are useful in lithium ion battery cells having lithium titanate anodes. The electrolyte formulations provide low temperature power performance and high temperature stability in such lithium ion battery cells.

14 Claims, 1 Drawing Sheet

100

Cathode

Separator / e-lyte

Anode

106

104

108

102

(56) References Cited

U.S. PATENT DOCUMENTS

| | | | | |
|---|---|---|---|---|
| 7,732,093 | B2 | 6/2010 | Xiao et al. | |
| 8,795,903 | B2 | 8/2014 | Smart et al. | |
| 2005/0106470 | A1 | 5/2005 | Yoon et al. | |
| 2006/0269834 | A1 * | 11/2006 | West | H01M 4/133 429/105 |
| 2007/0218364 | A1 | 9/2007 | Whitacre et al. | |
| 2010/0047695 | A1 | 2/2010 | Smart et al. | |
| 2011/0250503 | A1 | 10/2011 | Wilson et al. | |
| 2012/0100417 | A1 | 4/2012 | Ramprasad | |
| 2012/0100440 | A1 * | 4/2012 | Narula | H01M 2/1646 429/405 |
| 2013/0071731 | A1 | 3/2013 | Tokuda et al. | |
| 2013/0209915 | A1 | 8/2013 | Hirashita et al. | |
| 2013/0260229 | A1 | 10/2013 | Uzun et al. | |
| 2013/0295471 | A1 * | 11/2013 | Visco | H01M 4/86 429/405 |
| 2013/0337347 | A1 | 12/2013 | Pol et al. | |
| 2014/0023941 | A1 | 1/2014 | Amine et al. | |
| 2014/0079987 | A1 * | 3/2014 | Haruna | H01M 10/0525 429/188 |
| 2014/0170459 | A1 | 6/2014 | Wang et al. | |
| 2015/0140444 | A1 | 5/2015 | DuBois et al. | |

FOREIGN PATENT DOCUMENTS

| | | | | |
|---|---|---|---|---|
| JP | 2012174546 | * | 9/2012 | H01M 10/052 |
| WO | 2013033595 | A1 | 3/2013 | |
| WO | 2014080039 | A1 | 5/2014 | |
| WO | 2015073419 | A1 | 5/2015 | |

OTHER PUBLICATIONS

English translation of JP 2012/174546 (2012).*

Azimi et al., "Fluorinated Electrolytes for Li—S Battery: Suppressing the Self-Discharge with an Electrolyte Containing Fluoroether Solvent", Journal of the Electrochemical Society, (2015), 162(1), pp. A64-A68.

Kim et al., "The cycling performances of lithium-sulfer batteries in TEGDME/DOL containing LiNO3 additive" Ionics (2013), 19, pp. 1795-1802.

* cited by examiner

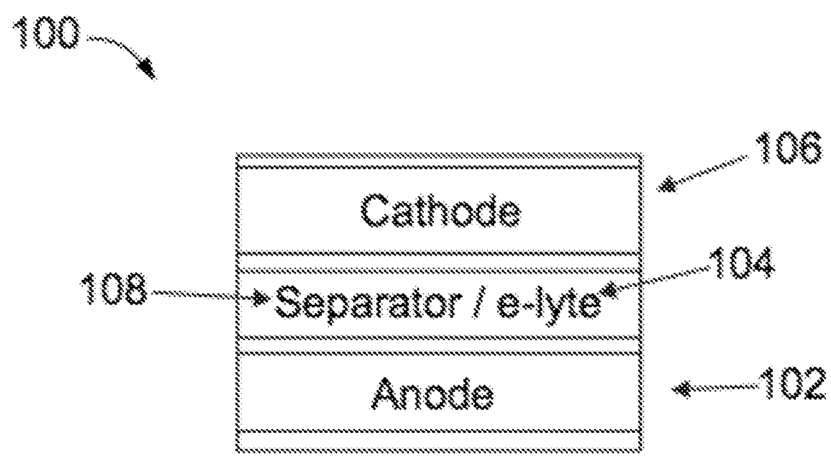
100
106
Cathode
108
Separator / e-lyte
104
Anode
102

ELECTROLYTE FORMULATIONS FOR LITHIUM ION BATTERIES

BACKGROUND OF THE INVENTION

The present invention is in the field of battery technology and, more particularly, electrolyte formulations that enable both low temperature and high temperature operation of lithium ion batteries.

Certain applications for lithium ion batteries require wide operating temperature ranges. In general, the power capability of lithium ion batteries suffers at low temperature due to one or more of the following factors: 1) an increase in viscosity of the electrolyte resulting in slower lithium ion diffusion; 2) a decrease in the ionic conductivity of the electrolyte; 3) a decrease in ionic conductivity of the solid electrolyte interphase (SEI) on the anode; and 4) a decrease in the diffusion rate of lithium ions through the electrode materials, especially the anode materials.

In the past, solutions to the problems associated with operating a lithium ion battery at low temperature have involved adding solvents that have very low melting points and/or low viscosity to the electrolyte formulation. Such additional solvents can help prevent the electrolyte solution from freezing or having substantially increased viscosity at low temperatures. However, such additional solvents tend to be detrimental to the high temperature performance of a lithium ion battery, and in particular the high temperature cycle life.

Certain of the shortcomings of known electrolyte formulations are addressed by embodiments of the invention disclosed herein by, for example, improving power performance at low temperature without substantially decreasing high temperature cycle life. Embodiments herein include additives and combinations of additives that improve the power performance at low temperature, but improve or maintain the high temperature cycle life relative to a baseline electrolyte formulation.

BRIEF SUMMARY OF THE INVENTION

Embodiments of the invention include a lithium ion battery cell having a first electrode, a second electrode formed of lithium titanate and an electrolyte solution. The electrolyte solution includes additives or combinations of additives that improve the power performance at low temperature, but improve or maintain the high temperature cycle life relative to baseline electrolyte formulation.

In some embodiments, the electrolyte formulation includes a fluorinated additive having chemical structure selected from the group consisting of carbonate, borate, oxaborolane, phosphate, phosphonate, phosphazene, ester, and combinations thereof. In some embodiments, the fluorinated additive includes a trifluoroethyl group.

BRIEF DESCRIPTION OF SEVERAL VIEWS OF THE DRAWINGS

FIG. 1 illustrates a schematic of a lithium ion battery implemented in accordance with an embodiment of the invention.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at room temperature (about 25 degrees C.), unless the context clearly dictates otherwise.

Ranges presented herein are inclusive of their endpoints. Thus, for example, the range 1 to 3 includes the values 1 and 3 as well as intermediate values.

The term "NMC" refers generally to cathode materials containing $LiNi_xMn_yCO_zO_w$, and includes, but is not limited to, cathode materials containing $LiNi_{0.33}Mn_{0.33}Co_{0.33}O_2$.

FIG. 1 illustrates a lithium ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes an electrolyte 104, which is disposed between the anode 102 and the cathode 106 and is formulated to remain substantially stable during battery cycling.

The operation of the battery 100 is based upon reversible intercalation and de-intercalation of lithium ions into and from host materials of the anode 102 and the cathode 106. Referring to FIG. 1, the voltage of the battery 100 is based on redox potentials of the anode 102 and the cathode 106, where Li ions are accommodated or released at a lower potential in the former and a higher potential in the latter.

Lithium titanate (e.g., $Li_4Ti_5O_{12}$; other stoichiometric ratios are included in the definition of lithium titanate) ("LTO") can be used as an active electrode material for an electrode in battery cell applications that require high power but do not require high energy density. Batteries with LTO electrodes can operate at a potential of about 1.55 V. In many lithium ion batteries using conventional electrolyte formulations, components within the electrolyte solution facilitate the in-situ formation of a protective film during the initial battery cycling. This protective film is referred to as a solid electrolyte interphase (SEI) layer on or next to an anode. The anode SEI can inhibit further reductive decomposition of the electrolyte components. However, it has been observed that SEI formation generally does not occur in battery cells with LTO anode. Recalling the factors above that are believed to limit low temperature performance ((1) an increase in viscosity of the electrolyte resulting in slower lithium ion diffusion; (2) a decrease in the ionic conductivity of the electrolyte; (3) a decrease in ionic conductivity of the SEI on the anode; and (4) a decrease in the diffusion rate of lithium ions through the electrode materials, especially the anode materials), the lack of SEI on an LTO anode means that the electrolyte formulation strongly influence the low temperature performance of batteries with LTO anodes.

At high temperature, stability of the battery cell can become compromised. Instability at high temperature is believed to be due to: 1) increased reactivity of electrolyte with an active material; 2) accelerated decomposition of $LiPF_6$, which generates decomposition products that can be reactive with the both the electrolyte and the electrode active materials; 3) gas generation (primarily $H_2$) due to presence of aprotic solvents and small amounts of water Parasitic reactions driven by the decomposition products can result in loss of cell capacity and further decomposition of any SEI.

Referring specifically to battery cells containing an LTO electrode, the high temperature stability of the electrolyte formulation can be compromised by catalytic effects of the titanium in certain oxidation states. At a higher oxidation state, titanium tends to undergo a proton extraction reaction that is believed to be one of main failure mechanisms of LTO anode.

Conventional solutions for the high temperature problem generally consist of applying coatings to the surface of the LTO electrode material, doping and particle coating. However, such methods tend to be ineffective and detrimental to low temperature power performance.

The low temperature performance of cells having LTO anodes is generally believed to be limited by the bulk solvent properties. That is, because there is no SEI formed on LTO surface to affect the low temperature performance, the low temperature performance must be significantly affected by the bulk solvent properties. Accordingly, it is expected that the addition of an additive would generally increase the cell impedance, and therefore negatively affect the low temperature performance. As a result, little work has been done in the past to investigate the effect of additives in an electrolyte formulation in LTO-based batteries.

Low temperature performance in lithium ion batteries can be characterized by the area specific impedance (ASI), which includes contributions due to the electrode materials, the possible SEI layers formed on those materials, and the bulk electrolyte properties. As this is a measure of impedance, low ASI values are desirable.

High temperature performance is characterized by measuring the change in ASI after storage at elevated temperature. Again, small changes in the ASI after storage are desirable, as that would indicate stability of the cell while stored at elevated temperature.

As is described in detail in co-pending U.S. application Ser. No. 14/746,746, which application is incorporated by reference herein in its entirety, electrolyte formulations for wide temperature range performance on LTO anodes must include solvents with good low temperature properties (low melting point, low viscosity, high conductivity, etc.). Additives that can form conductive and robust protection layer on LTO surface to not only improve interfacial ionic conductivity but also mitigate catalytic reactivity of $Ti^{3+}/Ti^{4+}$ especially at elevated temperatures.

In certain embodiments, the addition of a single additive compound improves the low temperature power performance of batteries having LTO anodes. For example, tris(2,2,2-trifluoroethyl)borate (structure (a)):

(a)

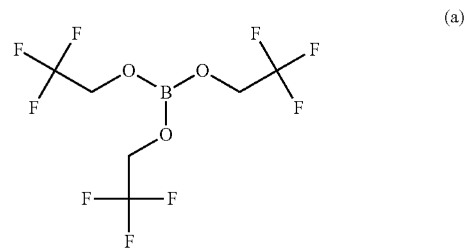 [SMILES: FC(F)(F)COB(OCC(F)(F)F)OCC(F)(F)F]

improves low temperature power performance. Another additive compound, tris(2,2,2-trifluoroethyl)phosphate (structure (b)):

(b)

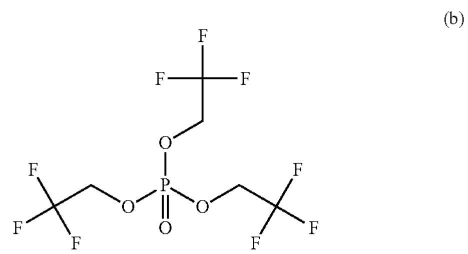 [SMILES: O=P(OCC(F)(F)F)(OCC(F)(F)F)OCC(F)(F)F]

also improves low temperature power performance. Still another additive compound, methyl 2,2,2,-trifluoroethyl carbonate (structure (c)):

(c)

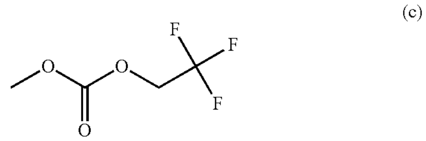

improves low temperature power performance.

The low temperature power performance of batteries having LTO anodes and containing electrolyte formulations including these additives is presented below in Table 2.

In certain embodiments, the addition of a single additive compound improves the high temperature stability of batteries having LTO anodes. For example, tris(2,2,2-trifluoroethyl)borate (structure (a) above) improves high temperature stability. Also, 4,4,5,5-tetramethyl-2-(4-trifluoromethylphenyl)-1,3,2-dioxaborolane (structure (d)):

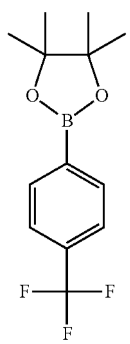

improves high temperature stability. Ethyl difluoroacetate (structure (e)):

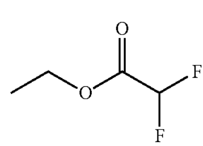

also improves high temperature stability. Another additive compound, diethyl (difluoromethyl)phosphonate (structure (f)):

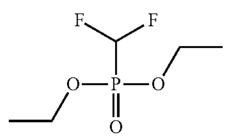

improves high temperature stability. The additive compound hexakis(1H,1H-trifluoroethoxy)phosphazene (structure (g)):

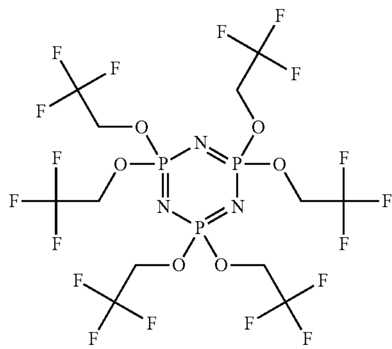

also improves high temperature stability. Still another additive compound, bis(2,2,2-trifluoroethyl)carbonate (structure (h)):

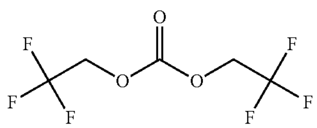

improves high temperature stability.

In certain embodiments of additive combinations disclosed herein, the electrolyte formulation includes certain boron-containing additives. The boron-containing additives are often strong electrophiles. In other words, they readily react with reductive decomposition intermediates from solvents and salts on the anode, which may result in a thinner but more thermally stable SEI. Effective boron-containing additives are believed to be highly activated compounds that contain at least one activated B—O bond.

In some embodiments, the boron-containing additive is a compound represented by structural formula (i):

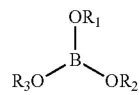

where at least one of $R_1$, $R_2$ and $R_3$ includes a fluorine. $R_1$, $R_2$ and are independently selected from the group consisting of substituted $C_1$-$C_{20}$ alkyl groups, substituted $C_1$-$C_{20}$ alkenyl groups, substituted $C_1$-$C_{20}$ alkynyl groups, and substituted $C_5$-$C_{20}$ aryl groups. At least one of the substitutions is a fluorine, and other additional substitutions are possible, include further fluorine substitutions. Preferred embodiments include tris(2,2,2-trifluoroethyl)borate and its derivatives.

In some embodiments, the boron-containing additive is a compound represented by structural formula (j):

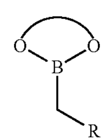

where R includes at least one electron-withdrawing moiety. Examples of electron withdrawing moieties include fluorine atoms, certain fluorine substituted structures, and structures having unsaturated carbons. Preferred embodiments include certain oxaborinanes and oxaborolanes. Preferred embodiments include 4,4,5,5-tetramethyl-2-(4-trifluoromethylphenyl)-1,3,2-dioxaborolane and its derivatives.

The high temperature stability of batteries having LTO anodes and containing electrolyte formulations including these additives is presented below in Table 2.

In certain embodiments, combinations of additives improve the wide operating temperature performance of lithium ion batteries having LTO anodes. Additive combinations were tested based on the improvements observed for the electrolyte formulations includes a single additive. For example, if additive A improves low temperature properties while additive B and additive C only improve high temperature properties, additive A would then be tested in combination with additive B and in combination with additive C. Notably, combining an additive shown to improve low temperature power performance with an additive shown to improve high temperature stability does not necessarily result in a formulation with improved low and high temperature properties. The combinations sometimes perform synergistically and sometimes do not.

A set of three low temperature additives were chosen to be combined with a set of five high temperature additives. The three low temperature power performance additives were tris(2,2,2-trifluoroethyl)borate ("TTFEB"), tris(2,2,2-trifluoroethyl)phosphate ("TTFEP") and methyl 2,2,2,-trifluoroethyl carbonate ("MTFEC"). The five high temperature stability additives were TTFEB, 4,4,5,5-tetramethyl-2-(4-trifluoromethylphenyl)-1,3,2-dioxaborolane ("TFMPDB"), ethyl difluoroacetate ("EDFA"), diethyl (difluoromethyl) phosphonate ("DFMP"), and lithium bis(oxalato)borate ("LiBOB"). In this case, LiBOB was used as a control. Thus, there were a total of 14 combinations as shown in Table 1 below. In general, additives were combined at their optimal concentration as determined by single additive testing.

TABLE 1

Summary of Additive Combinations

| | 2% TTFEB | 0.5% TTFEP | 2% MTFEC |
|---|---|---|---|
| 0.5% LiBOB (Control) | X | X | X |
| 0.5% TTFEB | | X | X |
| 0.5% TFMPDB | X | X | X |
| 0.5% DFMP | X | X | X |
| 2% EDFA | X | X | X |

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Electrolyte Solution Formulation

Electrolyte formulas included a lithium salt and a solvent blend. The lithium salt was $LiPF_6$, and was used at a concentration of 1.2M. Solvent blends were formulated from propylene carbonate (PC), sulfolane (SL), ethyl methyl carbonate (EMC), dimethyl carbonate (DMC), diethyl carbonate (DEC), methyl butyrate (MB) and methyl acetate (MA). Seven different solvent blends formulations were used:

Solvent Blend 1: PC/EMC/DMC/MB (20/30/40/10 by volume)

Solvent Blend 2: SL/EMC/DMC/MB (20/30/40/10 by volume)

Solvent Blend 3: PC/SL/EMC/DMC/MA (5/15/30/40/10 by volume)

Solvent Blend 4: PC/SL/EMC/DMC/MB (12.5/12.5/28.1/37.5/9.4 by volume)

Solvent Blend 5: SL/EMC/DMC/MA (25/28.1/37.5/9.4 by volume)

Solvent Blend 6: SL/EMC/DMC/DEC (25/28.1/37.5/9.4 by volume)

Solvent Blend 7: PC/EMC/DMC/MB (33.3/25/33.4/8.3 by volume)

Additives were included at concentrations varying between 0.5% and 2.0% by weight. A control electrolyte containing no additives was also used.

Battery Assembly.

Battery cells were formed in a high purity argon filled glove box (M-Braun, $O_2$ and humidity content <0.1 ppm). A $LiNi_xMn_yCo_zO_2$ (NMC, X+Y+Z=1) cathode material and a lithium titanate (LTO) anode material were used. Each battery cell includes the composite cathode film, a polyolefin separator, and the composite anode film. Electrolyte formulations were made according to the ratios and components described herein and added to the battery cell.

Electrochemical Formation.

The formation cycle for these NMC/LTO battery cells was a 6 hour open circuit voltage (OCV) hold followed by a charge to 2.8 V at rate C/10, with a constant voltage (CV) hold to C/20. The formation cycle was completed with a C/10 discharge to 1.5 V. All formation cycles were run at room temperature.

Electrochemical Characterization.

Initial area specific impedance (ASI) was measured after setting the target state of charge (SOC) by discharging the cell at rate of C/10 and then applying a 10 second pulse at a rate of 5 C. Low temperature ASI results were derived as follows: The cell was recharged to 2.8 V at a rate of C/5 at room temperature, with a CV hold at C/10 followed by a one hour OCV hold. Then, the ambient temperature was reduced to −25 degrees Celsius, followed by a 12 hour OCV hold to allow the test system temperature to equilibrate. All discharges to the specified SOC where conducted at −25 degrees Celsius at a rate of C/10, with a one-hour rest at the specified SOC. A discharge pulse at 50% SOC was done at a rate of 2 C for 10 seconds, followed by a 40 second rest. ASI was calculated from the initial voltage (V) prior to the pulse and the final voltage ($V_f$) at the end of the pulse according to Formula (1), where A is the cathode area and i is the current:

$$ASI(\Omega\cdot\mathrm{cm}^2) = \frac{(V_i - V_f)\times A}{i} \tag{1}$$

After full recharge to 2.8 V at room temperature, the cells were then stored at 60 degrees Celsius at OCV for two weeks. After two weeks the cells were removed from high temperature storage and then allowed to equilibrate to room temperature. The ASI was then measured by the same protocol used to determine initial ASI (setting the target SOC, and then applying a 10 second pulse at a rate of 5 C).

Results

The following tables present the results of the testing described herein of certain embodiments of the invention. The tables below identity the additive or the additive combination tested, with the concentration (described as a weight percent of the total formulation) in parentheses. In the case of additive combinations, the solvent blend is also identified. The tables also present the discharge capacity (in units of $mAh/cm^2$) measured at the first cycle and the coulombic efficiency (as a percent) of the first cycle. To demonstrate the wide operating temperature performance, several ASI measurements are listed in the tables. The column labeled "−25 C ASI" presents the data collected from the low temperature measurements of ASI (in units of $\Omega$*$cm^2$). The column labeled "1st ASI" presents the data collected from the initial room temperature measurements of ASI (in units of Ω*$cm^2$). The column labeled "2nd ASI" presents the data collected from the measurements of ASI after high temperature storage (in units of Ω*$cm^2$). The column labeled "Delta ASI" is the difference between the 1st ASI data and the 2nd ASI data. Thus, numbers lower than control for −25 C ASI and Delta ASI demonstrate improvements in low power performance and high temperature stability, respectively. Further, for wide operating temperature performance it is preferred that the values for 1st ASI be less than or equal to the 1st ASI value of the control.

Table 2 presents the data from testing of single additives in the electrolyte formulation PC/EMC/DMC/MB (20/30/40/10 by volume), 1.2M $LiPF_6$. The additive tris(2,2,2-trifluoroethyl) borate (TTFEB) at 2.0 weight percent demonstrates the largest improvement in low temperature power performance, while methyl 2,2,2,-trifluoroethyl carbonate (MTFEC) at 2.0 weight percent and tris(2,2,2-trifluoroethyl) phosphate (TTFEP) at 0.5 weight percent also demonstrate improvement in low temperature power performance.

Still referring to Table 2, diethyl(difluoromethyl)phosphonate (DFMP) at 0.5 weight percent demonstrates the largest improvement in high temperature stability. The additives tris(2,2,2-trifluoroethyl)borate (TTFEB) at 0.5 weight percent, 4,4,5,5-tetramethyl-2-(4-trifluoromethylphenyl)-1,3,2-dioxaborolane (TFMPDB) at 0.5 weight percent, and ethyl difluoroacetate (EDFA) at 2.0 weight percent demonstrate 1st ASI, 2nd ASI and Delta ASI values that are improved as compared to the control values.

TABLE 2

Summary of additives in solvent blend 1

| Additive (wt %) | Cyc1 Capacity (mAh/$cm^2$) | Cyc1 CE (%) | −25 C. ASI (Ω*$cm^2$) | 1st ASI | 2nd ASI | Delta ASI |
|---|---|---|---|---|---|---|
| Control (0) | 1.0 | 89.8 | 138.5 | 15.8 | 26.5 | 10.7 |
| tris(2,2,2-trifluoroethyl) borate (2.0) | 1.0 | 92.2 | 109.3 | 17.1 | 27.8 | 10.7 |
| methyl 2,2,2,-trifluoroethyl carbonate (2.0) | 1.0 | 90.8 | 127.4 | 17.0 | 32.8 | 15.8 |
| tris(2,2,2-trifluoroethyl) phosphate (0.5) | 1.0 | 90.2 | 128.7 | 16.3 | 33.9 | 17.6 |
| methyl 2,2,2,-trifluoroethyl carbonate (0.5) | 1.0 | 88.3 | 133.4 | 19.0 | 39.6 | 20.6 |
| diethyl (difluoromethyl) phosphonate (0.5) | 1.0 | 90.7 | 155.5 | 15.4 | 19.1 | 3.7 |
| tris(2,2,2-trifluoroethyl) borate (0.5) | 1.0 | 92.2 | 122.8 | 15.2 | 22.5 | 7.3 |
| hexakis(1H,1H-trifluoroethoxy) phosphazene (2.0) | 1.0 | 90.2 | 186.4 | 17.2 | 24.7 | 7.5 |
| bis(2,2,2-trifluoroethyl) carbonate (2.0) | 1.0 | 89.8 | 164.9 | 16.8 | 25.1 | 8.3 |
| 4,4,5,5-tetramethyl-2-(4-trifluoromethyl phenyl)-1,3,2-dioxaborolane (0.5) | 1.0 | 91.4 | 141.0 | 14.2 | 23.0 | 8.9 |
| Ethyl difluoroacetate (2.0) | 1.0 | 90.6 | 137.0 | 14.0 | 23.1 | 9.1 |

Table 3 presents the data from testing of additive combinations in the electrolyte formulation PC/EMC/DMC/MB (20/30/40/10 by volume), 1.2M $LiPF_6$. Several combinations demonstrated improved wide operating temperature range performance as compared to the control, including 2.0 weight percent MTFEC with 0.5 weight percent TTFEB, 2.0 weight percent MTFEC with 0.5 weight percent DFMP, 0.5 weight percent TTFEP with 0.5 weight percent TTFEB, 0.5 weight percent TTFEP with 0.5 weight percent DFMP, 2.0 weight percent TTFEB with 0.5 weight percent TFMPDB, and 2.0 weight percent TTFEB with 0.5 weight percent DFMP. The combination of 2.0 weight percent MTFEC with 0.5 weight percent LiBOB also showed improved wide operating temperature range performance.

TABLE 3

Summary of additive combinations in solvent blend 1

| Additive combination (wt %) | Cyc1 Capacity (mAh/$cm^2$) | Cyc1 CE (%) | −25 C. ASI (Ω*$cm^2$) | 1st ASI | 2nd ASI | Delta ASI |
|---|---|---|---|---|---|---|
| Solvent Blend 1 with no additive | 1.0 | 89.8 | 138.5 | 15.8 | 26.5 | 10.7 |
| MTFEC (2.0)/ TTFEB (0.5) | 1.0 | 89.9 | 131.7 | 13.0 | 18.5 | 5.5 |
| MTFEC (2.0 / TFMPDB (0.5) | 1.0 | 91.3 | 142.5 | 13.0 | 19.1 | 6.1 |
| MTFEC (2.0)/ DFMP (0.5) | 1.0 | 91.1 | 114.2 | 13.5 | 18.3 | 4.8 |
| MTFEC (2.0)/ EDFA (2.0) | 1.1 | 80.7 | 310.3 | 13.8 | 20.1 | 6.3 |
| MTFEC (2.0)/ LiBOB (0.5) | 1.0 | 91.2 | 119.0 | 13.8 | 20.9 | 7.1 |
| TTFEP (0.5)/ TTFEB (0.5) | 1.0 | 92.3 | 117.5 | 13.7 | 20.7 | 7.0 |
| TTFEP (0.5)/ TFMPDB (0.5) | 1.0 | 89.8 | 156.6 | 12.6 | 19.6 | 7.0 |
| TTFEP (0.5)/ DFMP (0.5) | 1.0 | 91.8 | 115.6 | 13.0 | 18.0 | 5.0 |
| TTFEP (0.5)/ EDFA (2.0) | 1.0 | 90.3 | 157.1 | 15.6 | 25.9 | 10.2 |
| TTFEP (0.5)/ LiBOB (0.5) | 1.0 | 91.4 | 152.6 | 13.8 | 19.6 | 5.7 |
| TTFEB (2.0)/ TFMPDB (0.5) | 1.0 | 89.6 | 102.5 | 13.7 | 17.8 | 4.1 |
| TTFEB (2.0)/ DFMP (0.5) | 1.0 | 92.1 | 101.0 | 13.4 | 17.3 | 3.8 |
| TTFEB (2.0)/ EDFA (2.0) | 1.0 | 92.2 | 97.4 | 15.2 | 27.1 | 11.9 |
| TTFEB (2.0)/ LiBOB (0.5) | 1.0 | 87.3 | 144.9 | 16.3 | 24.4 | 8.1 |

Table 4 presents the data from testing of additive combinations in the electrolyte formulation SL/EMC/DMC/MB (20/30/40/10 by volume), 1.2M $LiPF_6$. Several of the additive combinations provided improved low temperature power performance as compared to control and some additive combinations provided improved high temperature stability as compared to control. For example, 2.0 weight percent TTFEB with 0.5 weight percent TFMPDB showed improved performance.

TABLE 4

Summary of additive combinations in solvent blend 2

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| Solvent Blend 2 with no additive | 1.0 | 92.4 | 101.3 | 15.3 | 20.3 | 5.0 |
| MTFEC (2.0)/ TTFEB (0.5) | 1.0 | 91.9 | 110.0 | 14.7 | 19.9 | 5.3 |
| MTFEC (2.0)/ TFMPDB (0.5) | 1.0 | 91.4 | 118.2 | 15.6 | 22.6 | 7.0 |
| MTFEC (2.0)/ DFMP (0.5) | 1.0 | 91.0 | 109.4 | 13.2 | 18.7 | 5.5 |
| MTFEC (2.0)/ EDFA (2.0) | 1.0 | 90.1 | 98.9 | 13.2 | 26.4 | 13.2 |
| MTFEC (2.0)/ LiBOB (0.5) | 1.0 | 91.1 | 116.4 | 13.9 | 20.4 | 6.5 |
| TTFEP (0.5)/ TTFEB (0.5) | 1.0 | 88.0 | 122.5 | 16.2 | 20.9 | 4.7 |
| TTFEP (0.5)/ TFMPDB (0.5) | 1.0 | 91.5 | 126.8 | 16.5 | 21.7 | 5.2 |
| TTFEP (0.5)/ DFMP (0.5) | 1.0 | 91.7 | 128.1 | 15.1 | 17.8 | 2.7 |
| TTFEP (0.5)/ EDFA (2.0) | 1.0 | 91.3 | 127.9 | 15.3 | 21.1 | 5.8 |
| TTFEP (0.5)/ LiBOB (0.5) | 1.0 | 90.6 | 114.4 | 16.1 | 23.6 | 7.5 |
| TTFEB (2.0)/ TFMPDB (0.5) | 1.0 | 91.9 | 99.9 | 14.2 | 18.8 | 4.6 |
| TTFEB (2.0)/ DFMP (0.5) | 1.0 | 84.5 | 128.4 | 15.7 | 18.7 | 3.1 |
| TTFEB (2.0)/ EDFA (2.0) | 1.0 | 86.3 | 128.5 | 15.9 | 24.3 | 8.4 |
| TTFEB (2.0)/ LiBOB (0.5) | 1.1 | 79.1 | 129.6 | 15.8 | 19.3 | 3.5 |

Table 5 presents the data from testing of additive combinations in the electrolyte formulation PC/SL/EMC/DMC/MA (5/15/30/40/10 by volume), 1.2M $LiPF_6$. Several of the additive combinations provided improved low temperature power performance as compared to control and some additive combinations provided improved high temperature stability as compared to control. For example, 2.0 weight percent MTFEC with 0.5 weight percent TTFEB, 2.0 weight percent MTFEC with 0.5 weight percent DFMP, 0.5 weight percent TTFEP with 0.5 weight percent DFMP, and 0.5 weight percent TTFEP with 0.5 weight percent LiBOB showed improved performance.

TABLE 5

Summary of additive combinations in solvent blend 3

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| Solvent Blend 3 with no additive | 1.0 | 90.6 | 130.1 | 12.5 | 16.0 | 3.9 |
| MTFEC (2.0)/ TTFEB (0.5) | 1.0 | 91.9 | 102.5 | 13.9 | 15.7 | 2.4 |
| MTFEC (2.0)/ TFMPDB (0.5) | 1.0 | 90.8 | 111.9 | 14.6 | 21.0 | 6.7 |
| MTFEC (2.0)/ DFMP (0.5) | 1.0 | 92.1 | 126.3 | 13.6 | 15.5 | 2.3 |
| MTFEC (2.0)/ EDFA (2.0) | 1.0 | 90.4 | 124.8 | 14.2 | 18.3 | 4.6 |
| MTFEC (2.0)/ LiBOB (0.5) | 1.0 | 91.2 | 133.9 | 13.9 | 18.0 | 4.3 |
| TTFEP (0.5)/ TTFEB (0.5) | 1.0 | 92.3 | 109.9 | 17.0 | 21.3 | 4.8 |
| TTFEP (0.5)/ TFMPDB (0.5) | 1.0 | 89.6 | 124.9 | 14.7 | 21.9 | 7.6 |
| TTFEP (0.5)/ DFMP (0.5) | 1.0 | 91.7 | 126.5 | 14.0 | 16.1 | 2.5 |
| TTFEP (0.5)/ EDFA (2.0) | 1.0 | 90.3 | 120.5 | 15.1 | 20.6 | 6.0 |
| TTFEP (0.5)/ LiBOB (0.5) | 1.0 | 91.6 | 114.4 | 14.5 | 17.9 | 3.6 |
| TTFEB (2.0)/ TFMPDB (0.5) | 1.0 | 92.6 | 90.8 | 13.5 | 19.1 | 6.2 |
| TTFEB (2.0)/ DFMP (0.5) | 1.0 | 92.4 | 90.2 | 13.1 | 17.0 | 4.5 |
| TTFEB (2.0)/ EDFA (2.0) | 1.0 | 92.3 | 87.4 | 13.3 | 21.3 | 8.6 |
| TTFEB (2.0)/ LiBOB (0.5) | 1.0 | 88.5 | 107.9 | 13.9 | 21.6 | 8.1 |

Table 6 presents the data from testing of additive combinations in the electrolyte formulation PC/SL/EMC/DMC/MB (12.5/12.5/28.1/37.5/9.4 by volume), 1.2M $LiPF_6$. Several of the additive combinations provided improved low temperature power performance as compared to control and some additive combinations provided improved high temperature stability as compared to control. For example, 2.0 weight percent TTFEB with 0.5 weight percent TFMPDB showed improved performance.

TABLE 6

Summary of additive combinations in solvent blend 4

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| Solvent Blend 4 with no additive | 1.0 | 91.7 | 98.7 | 12.4 | 18.2 | 5.7 |
| MTFEC (2.0)/ TTFEB (0.5) | 1.0 | 90.2 | 111.6 | 15.5 | 30.0 | 14.6 |
| MTFEC (2.0)/ TFMPDB (0.5) | 1.0 | 90.5 | 114.7 | 13.3 | 18.1 | 4.8 |
| MTFEC (2.0)/ DFMP (0.5) | 1.0 | 90.0 | 127.0 | 15.9 | 36.7 | 20.7 |
| MTFEC (2.0)/ EDFA (2.0) | 1.0 | 92.0 | 140.4 | 16.8 | 25.0 | 8.2 |
| MTFEC (2.0)/ LiBOB (0.5) | 1.0 | 92.7 | 116.8 | 16.1 | 23.1 | 7.0 |
| TTFEP (0.5)/ TTFEB (0.5) | 1.0 | 90.8 | 134.3 | 14.3 | 21.5 | 7.2 |
| TTFEP (0.5)/ TFMPDB (0.5) | 1.0 | 92.4 | 147.0 | 16.2 | 18.3 | 2.1 |
| TTFEP (0.5)/ DFMP (0.5) | 1.0 | 92.3 | 131.1 | 13.4 | 20.0 | 6.6 |
| TTFEP (0.5)/ EDFA (2.0) | 1.0 | 92.4 | 152.3 | 17.5 | 24.4 | 6.9 |
| TTFEP (0.5)/ LiBOB (0.5) | 1.0 | 92.8 | 108.9 | 14.4 | 20.0 | 5.6 |
| TTFEB (2.0)/ TFMPDB (0.5) | 1.0 | 93.0 | 97.8 | 12.1 | 15.6 | 3.5 |
| TTFEB (2.0)/ DFMP (0.5) | 1.0 | 92.9 | 122.4 | 15.5 | 25.4 | 9.9 |
| TTFEB (2.0)/ EDFA (2.0) | 1.0 | 85.5 | 154.9 | 16.0 | 25.9 | 9.9 |
| TTFEB (2.0)/ LiBOB (0.5) | 1.0 | 91.7 | 98.7 | 12.4 | 18.2 | 5.7 |

Table 7 presents the data from testing of additive combinations in the electrolyte formulation SL/EMC/DMC/MA (25/28.1/37.5/9.4 by volume), 1.2M $LiPF_6$. Several of the additive combinations provided improved low temperature power performance as compared to control. For example, 0.5 weight percent TTFEP with 0.5 weight percent TTFEB and 2.0 weight percent TTFEB with 0.5 weight percent DFMP showed improved performance.

TABLE 7

Summary of additive combinations in solvent blend 5

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| Solvent Blend 5 with no additive | 1.0 | 92.5 | 115.6 | 14.0 | 18.3 | 4.3 |
| MTFEC (2.0)/ TTFEB (0.5) | 1.0 | 90.5 | 101.0 | 15.6 | 23.2 | 7.7 |
| MTFEC (2.0)/ TFMPDB (0.5) | 1.0 | 88.2 | 112.8 | 14.6 | 31.0 | 16.4 |
| MTFEC (2.0)/ DFMP (0.5) | 1.0 | 91.0 | 116.8 | 15.8 | 26.4 | 10.6 |
| MTFEC (2.0)/ EDFA (2.0) | 1.0 | 89.7 | 110.9 | 14.4 | 30.7 | 16.3 |
| MTFEC (2.0)/ LiBOB (0.5) | 1.0 | 91.5 | 107.9 | 16.3 | 23.0 | 6.7 |
| TTFEP (0.5)/ TTFEB (0.5) | 1.0 | 92.1 | 89.7 | 14.0 | 18.4 | 4.4 |
| TTFEP (0.5)/ TFMPDB (0.5) | 1.0 | 92.0 | 139.0 | 16.3 | 24.0 | 7.6 |
| TTFEP (0.5)/ DFMP (0.5) | 1.0 | 92.0 | 126.9 | 15.9 | 21.4 | 5.5 |
| TTFEP (0.5)/ EDFA (2.0) | 1.0 | 91.8 | 130.1 | 16.5 | 23.8 | 7.3 |
| TTFEP (0.5)/ LiBOB (0.5) | 1.0 | 91.3 | 153.9 | 18.4 | 22.9 | 4.5 |
| TTFEB (2.0)/ TFMPDB (0.5) | 1.0 | 92.8 | 109.7 | 14.8 | 20.8 | 5.9 |
| TTFEB (2.0)/ DFMP (0.5) | 1.0 | 92.5 | 86.5 | 13.8 | 18.1 | 4.3 |
| TTFEB (2.0)/ EDFA (2.0) | 1.0 | 92.5 | 113.0 | 15.6 | 27.0 | 11.4 |
| TTFEB (2.0)/ LiBOB (0.5) | 1.0 | 87.9 | 105.0 | 15.0 | 23.0 | 7.9 |

Table 8 presents the data from testing of additive combinations in the electrolyte formulation SL/EMC/DMC/DEC (25/28.1/37.5/9.4 by volume), 1.2M $LiPF_6$. Some of the additive combinations provided improved low temperature power performance as compared to control.

TABLE 8

Summary of additive combinations in solvent blend 6

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| Solvent Blend 6 with no additive | 1.0 | 91.8 | 105.1 | 14.9 | 18.1 | 3.3 |
| MTFEC (2.0)/ TTFEB (0.5) | 1.0 | 91.8 | 125.6 | 22.2 | 36.3 | 14.1 |
| MTFEC (2.0)/ TFMPDB (0.5) | 1.0 | 91.8 | 129.0 | 15.7 | 28.8 | 13.1 |
| MTFEC (2.0)/ DFMP (0.5) | 1.0 | 89.3 | 120.1 | 17.6 | 27.9 | 10.3 |
| MTFEC (2.0)/ EDFA (2.0) | 1.0 | 89.2 | 120.9 | 17.5 | 120.7 | 103.2 |
| MTFEC (2.0)/ LiBOB (0.5) | 1.0 | 91.4 | 147.1 | 17.4 | 24.4 | 7.0 |
| TTFEP (0.5)/ TTFEB (0.5) | 1.0 | 92.5 | 102.4 | 15.2 | 21.2 | 6.1 |
| TTFEP (0.5)/ TFMPDB (0.5) | 1.0 | 92.5 | 131.5 | 15.4 | 23.0 | 7.6 |
| TTFEP (0.5)/ DFMP (0.5) | 1.0 | 92.2 | 125.2 | 16.1 | 22.0 | 5.9 |
| TTFEP (0.5)/ EDFA (2.0) | 1.0 | 91.8 | 115.4 | 14.7 | 24.1 | 9.4 |

TABLE 8-continued

Summary of additive combinations in solvent blend 6

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| TTFEP (0.5)/ LiBOB (0.5) | 1.0 | 92.1 | 131.8 | 14.9 | 19.6 | 4.7 |
| TTFEB (2.0)/ TFMPDB (0.5) | 1.0 | 92.9 | 116.8 | 15.7 | 21.3 | 5.6 |
| TTFEB (2.0)/ DFMP (0.5) | 1.0 | 92.2 | 96.2 | 16.4 | 24.3 | 7.8 |
| TTFEB (2.0)/ EDFA (2.0) | 1.0 | 92.3 | 89.8 | 16.6 | 31.5 | 15.0 |
| TTFEB (2.0)/ LiBOB (0.5) | 1.0 | 88.3 | 113.8 | 18.0 | 33.0 | 15.0 |

Table 9 presents the data from testing of additive combinations in the electrolyte formulation PC/EMC/DMC/MB (33.3/25/33.4/8.3 by volume), 1.2M $LiPF_6$. The additive combinations of 0.5 weight percent TTFEP with 0.5 weight percent TTFEB, 0.5 weight percent TTFEP with 0.5 weight percent DFMP, 0.5 weight percent TTFEP with 0.5 weight percent LiBOB, and 2.0 weight percent TTFEB with 0.5 weight percent DFMP demonstrated improved wide operating temperature range performance as compared to the control.

TABLE 9

Summary of additive combinations in solvent blend 7

| Additive combination (wt %) | Cyc1 Capacity (mAh/cm$^2$) | Cyc1 CE (%) | −25 C. ASI (Ω*cm$^2$) | 1st ASI | 2nd ASI | Delta ASI |
|---|---|---|---|---|---|---|
| Solvent Blend 7 with no additive | 1.0 | 91.5 | 148.5 | 15.5 | 21.2 | 5.7 |
| MTFEC (2.0)/ TTFEB (0.5) | 1.0 | 91.1 | 116.5 | 13.6 | 20.1 | 6.6 |
| MTFEC (2.0)/ TFMPDB (0.5) | 1.0 | 90.4 | 106.8 | 14.0 | 20.4 | 6.4 |
| MTFEC (2.0)/ DFMP (0.5) | 1.0 | 88.1 | 129.7 | 15.6 | 25.2 | 9.6 |
| MTFEC (2.0)/ EDFA (2.0) | 1.0 | 85.5 | 118.6 | 14.2 | 27.7 | 13.5 |
| MTFEC (2.0)/ LiBOB (0.5) | 1.0 | 91.7 | 150.0 | 15.9 | 24.9 | 8.9 |
| TTFEP (0.5)/ TTFEB (0.5) | 1.0 | 91.8 | 110.6 | 13.8 | 18.6 | 4.8 |
| TTFEP (0.5)/ TFMPDB (0.5) | 1.0 | 89.6 | 123.5 | 15.2 | 23.1 | 7.9 |
| TTFEP (0.5)/ DFMP (0.5) | 1.0 | 89.7 | 135.8 | 13.7 | 19.0 | 5.2 |
| TTFEP (0.5)/ EDFA (2.0) | 1.0 | 88.3 | 116.5 | 13.1 | 22.0 | 8.9 |
| TTFEP (0.5)/ LiBOB (0.5) | 1.0 | 90.5 | 127.4 | 13.9 | 18.4 | 4.5 |
| TTFEB (2.0)/ TFMPDB (0.5) | 1.0 | 92.9 | 107.3 | 14.0 | 21.2 | 7.1 |
| TTFEB (2.0)/ DFMP (0.5) | 1.0 | 92.3 | 100.5 | 12.9 | 16.1 | 3.2 |
| TTFEB (2.0)/ EDFA (2.0) | 1.0 | 92.3 | 100.3 | 14.1 | 22.1 | 8.0 |
| TTFEB (2.0)/ LiBOB (0.5) | 1.0 | 87.8 | 129.1 | 14.7 | 23.1 | 8.4 |

For all of the additive and additive combinations that provided improved low temperature power performance, high temperature stability, or both, no negative effects on initial discharge capacities or coulombic efficiencies were observed as compared to the control electrolyte formulations.

Without being bound to a particular hypothesis, theory, or proposed mechanism of action, the performance improvement imparted by the additives or combinations of additives is due to improvements in the SEI layer, specifically on the LTO anode. LTO anodes operate at a much higher voltage than graphite anodes. At these higher voltages, conventional additives used to produce SEI on graphite anodes cannot be reduced to form a passivation layer on an LTO anode. However, the chemical reduction potential at the electrode/electrolyte interface can be significantly increased in presence of strong electron-withdrawing functionality. In embodiments disclosed herein, the fluorinated groups in the additives provide that strong electron-withdrawing functionality, which allows the additives to function as SEI forming additives to improve the low temperature power performance and/or high temperature stability of LTO anodes. However, it is important to note that certain combinations of fluorinated additives provide low temperature power performance, high temperature stability, or both. It is not obvious which combinations will provide wide operating temperature range performance.

Further, the additives and an additive compounds disclosed herein may provide for the formation on an electrochemically active SEI that is formed due to the specific chemical interactions between these additives and the LTO anode. That is, the reaction products formed by these additives and the LTO surface may facilitate the formation of an electrochemically active SEI. This is a surprising result given that an SEI formed on an LTO surface would be expected to increase the impedance of the electrochemical cell, and indeed that increase in impedance is seen in certain additives combinations in certain solvent blends found in the tables above.

The fluorinated chemical structures that have demonstrated improved low temperature power performance, high temperature stability, or both include carbonates, borates, oxaborolanes, phosphates, phosphonates, phosphazene, and esters. It is anticipated, based on the disclosures supported by the testing herein, that certain fluorinated version of these chemical structures will provide low temperature power performance, high temperature stability, or both. Indeed, it is anticipated that other strong electron-withdrawing functionality may be combined with the chemical structures disclosed herein (e.g., carbonates, borates, oxaborolanes, phosphates, phosphonates, phosphazene, and esters) to yield additive compounds that alone or in combination will provide low temperature power performance, high temperature stability, or both.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A lithium ion battery cell, comprising:

a first electrode;

a second electrode comprising a lithium titanate active material; and an electrolyte formulation comprising $LiPF_6$ as a lithium salt and comprising a first additive and a second additive, wherein the first additive comprises tris(2,2,2-trifluoroethyl)borate and the second additive comprises 4,4,5,5-tetramethyl-2-(4-trifluoromethylphenyl)-1,3,2-dioxaborolane.

2. The lithium ion battery cell of claim 1, wherein the electrolyte formulation further comprises ethyl difluoroacetate.

3. The lithium ion battery cell of claim 1, wherein the electrolyte formulation further comprises a third additive that comprises a fluorinated phosphonate.

4. The lithium ion battery cell of claim 3, wherein the third additive comprises diethyl (difluoromethyl)phosphonate.

5. The lithium ion battery cell of claim 1, wherein the electrolyte formulation further comprises a third additive that comprises a fluorinated phosphate.

6. The lithium ion battery cell of claim 5, wherein the third additive comprises tris(2,2,2-trifluoroethyl)phosphate.

7. The lithium ion battery cell of claim 1, wherein the electrolyte formulation further comprises a third additive that comprises a fluorinated carbonate.

8. The lithium ion battery cell of claim 7, wherein the third additive comprises methyl 2,2,2-trifluoroethyl carbonate.

9. The lithium ion battery cell of claim 1, wherein the electrolyte formulation comprises 2.0 weight percent of the first additive.

10. The lithium ion battery cell of claim 1, wherein the electrolyte formulation comprises 0.5 weight percent of the second additive.

11. The lithium ion battery cell of claim 1, wherein the electrolyte formulation further comprises a solvent blend, the solvent blend comprising one or more of propylene carbonate, sulfolane, ethyl methyl carbonate, dimethyl carbonate, diethyl carbonate, methyl butyrate, or methyl acetate.

12. The lithium ion battery cell of claim 1, wherein the electrolyte formulation further comprises a solvent blend, the solvent blend comprising at least two compounds selected from the group consisting of propylene carbonate, sulfolane, ethyl methyl carbonate, dimethyl carbonate, diethyl carbonate, methyl butyrate, and methyl acetate.

13. The lithium ion battery cell of claim 1, wherein the first electrode includes a compound comprising lithium, nickel, manganese, cobalt, and oxygen.

14. The lithium ion battery cell of claim 1, wherein the first electrode comprises $LiNi_xMn_yCo_zO_2$, and x+y+z=1.

* * * * *